US009565623B2

(12) United States Patent
Byard et al.

(10) Patent No.: US 9,565,623 B2
(45) Date of Patent: Feb. 7, 2017

(54) SYSTEMS AND METHODS FOR ORDERING CANDIDATES FOR WIRELESS NETWORK ASSOCIATION

(71) Applicant: Digi International Inc., Minnetonka, MN (US)

(72) Inventors: Robert P. Byard, Sandy, UT (US); Joel Lovinger, Davis, CA (US); Jared Hofhiens, Lehi, UT (US); John Patrick Filoso, Pleasant Grove, UT (US)

(73) Assignee: Digi International Inc., Minnetonka, MN (US)

( * ) Notice: Subject to any disclaimer, the term of this patent is extended or adjusted under 35 U.S.C. 154(b) by 42 days.

(21) Appl. No.: 14/457,962

(22) Filed: Aug. 12, 2014

(65) Prior Publication Data

US 2016/0050616 A1  Feb. 18, 2016

(51) Int. Cl.
*G06F 15/177* (2006.01)
*H04J 3/14* (2006.01)
*H04W 48/16* (2009.01)
*H04W 76/02* (2009.01)

(52) U.S. Cl.
CPC .......... *H04W 48/16* (2013.01); *H04W 76/027* (2013.01); *Y02B 60/50* (2013.01)

(58) Field of Classification Search
CPC ...... H04W 48/16; H04W 72/00; H04W 74/00; H04W 76/02; H04W 76/027; H04W 74/002; H04W 72/005; Y02B 60/05
USPC ....................................................... 370/329
See application file for complete search history.

(56) References Cited

U.S. PATENT DOCUMENTS

| 2007/0177511 | A1* | 8/2007 | Das | H04L 45/42 370/238 |
| 2009/0059919 | A1* | 3/2009 | Kim | H04W 48/12 370/389 |
| 2009/0168768 | A1* | 7/2009 | Chiabaut | H04L 45/00 370/389 |
| 2010/0091669 | A1 | 4/2010 | Liu et al. | |

(Continued)

OTHER PUBLICATIONS

Gislason, "ZigBee applications—Part 3: ZigBee PANs", "Retrieved Apr. 24, 2014 from http://www.eetimes.com/document.asp?doc_id=1278202&print=yes", Jul. 23, 2010, pp. 1-11, Publisher: EE Times.

*Primary Examiner* — Edan Orgad
*Assistant Examiner* — Vanneilian Lalchinthang
(74) *Attorney, Agent, or Firm* — Fogg and Powers LLC

(57) ABSTRACT

Systems and methods for ordering candidates for wireless network association are provided. In certain embodiments, a wireless device, includes a processor that controls data received and data to be transmitted by the wireless device; and a memory, wherein the memory stores a short list that stores network device responses, wherein a network device response is associated with a network device in an environment of the wireless device. In certain implementations, instructions direct the processor to perform a short list search, wherein the wireless device attempts to connect to networks associated with network devices identified in the short list; and when the wireless device fails to connect with the networks associated with the network devices identified in the short list, perform an exhaustive search, wherein the wireless device attempts to connect to additional networks associated with additional network devices based on an ordered arrangement of network identifiers.

12 Claims, 7 Drawing Sheets

(56) References Cited

U.S. PATENT DOCUMENTS

| | | | | |
|---|---|---|---|---|
| 2011/0038254 A1* | 2/2011 | Hashiguchi | ......... | H04L 45/1283 370/217 |
| 2011/0264772 A1* | 10/2011 | Krapf | ..................... | G06F 8/61 709/220 |
| 2013/0094597 A1* | 4/2013 | Vijayasankar | ......... | H04B 3/542 375/257 |
| 2013/0149966 A1* | 6/2013 | Lee | ..................... | H04W 12/08 455/41.2 |
| 2013/0322281 A1* | 12/2013 | Ludlow | ................ | H04W 48/18 370/252 |
| 2015/0208320 A1* | 7/2015 | Alexander | ............ | H04W 4/008 370/254 |

* cited by examiner

SYSTEMS AND METHODS FOR ORDERING CANDIDATES FOR WIRELESS NETWORK ASSOCIATION

BACKGROUND

Electronic devices are able to operate wirelessly by communicating over networks. When a "wireless device" is introduced into an environment, the wireless device connects to a network and then communicates with other devices over the network. However, the wireless device first identifies a desired network over which to communicate and in certain environments there may be multiple networks in the neighborhood of a wireless device. When only one network is the desired network in a neighborhood of multiple networks, a wireless device orders the candidates to reduce the number of association attempts with each candidate network.

In one particular method, a wireless device attempts to connect with networks based on the order in which a network responds to a beacon request. For example, a wireless device searches available frequency channels for the first joinable response from a network. When the wireless device finds the network, the wireless device attempts to associate with the network. After association, the wireless device is able to determine if the network is the desired network. If the associated network is not the desired network, the wireless device increments the channel to the next channel and again searches for the first joinable response from a network. The wireless device repeats this process until the wireless device associates with the desired network. While this is a fast way to select a candidate for an association attempt, it may require many tries before the desired network is found. Further, the expected number of association attempts before successfully associating with the desired network increases as the number of joinable candidate networks increase. Problematically, under this "first responder" method, the wireless device can fail to join the desired network at all if undesired networks always respond first.

In an alternative method, a wireless device searches the channels for a network that responds to a beacon request with the strongest joinable beacon response. When a network providing the strongest joinable beacon response is identified, the wireless device attempts to associate with the identified network. Attempting to associate with the network providing the strongest joinable beacon response may work well if a node of the desired network is closest to the wireless device. However, attempting to associate with the network providing the strongest joinable beacon response may fail consistently if an unwanted network generates a stronger beacon response.

In some further implementations, when a wireless device is either searching for a network that provides the strongest joinable beacon response or searching for a network that provides the first response, the wireless device may store multiple responses in memory. For example, the wireless device may store the first X responders or the strongest X responders. However, if the desired network is the X+1 network to provide a response or the response provided by the desired network is the X+1 strongest response, then the wireless device will be unable to associate with the desired network.

SUMMARY

Systems and methods for ordering candidates for wireless network association are provided. In at least one implementation, a wireless device, comprises a processor that controls data received and data to be transmitted by the wireless device; and a memory, wherein the memory stores at least a short list and instructions, wherein the short list stores a finite number of network device response, wherein a network device response is associated with a network device in an environment of the wireless device. In at least one implementation, instructions direct the processor to perform a short list search, wherein the short list attempts to connect to networks associated with the network devices identified by the network device responses stored in the short list; and when the wireless device fails to connect with the networks associated with the network devices identified by the network device responses stored in the short list, perform an exhaustive search, wherein the wireless device attempts to connect to additional networks associated with additional network devices based on an ordered arrangement of network identifiers in a plurality of network device responses, wherein the plurality of network device responses where received in response to a plurality of network device requests.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the Figures and the specification is not to be construed as limiting the order in which the individual steps may be performed. The following detailed description is, therefore, not to be taken in a limiting sense.

Embodiments described below in the present disclosure provide systems and methods for ordering candidates for wireless network association. In one particular embodiment described herein, to order the different candidates, starting at low transmit power and a particular channel, thereafter at increasing power levels and incremented channels, a wireless device broadcasts network requests to build a short list of proximate joinable network device responses. Then, the wireless device individually attempts to associate with the different joinable network device responses in the short list. However, if none of the transponders representing networks identified in the short list is associated with the desired network, then the wireless device performs an exhaustive search of networks not on the short list by searching each channel and within each channel attempting to associate based on network identifiers of the network responders in monotonic increasing order.

Figure 1:
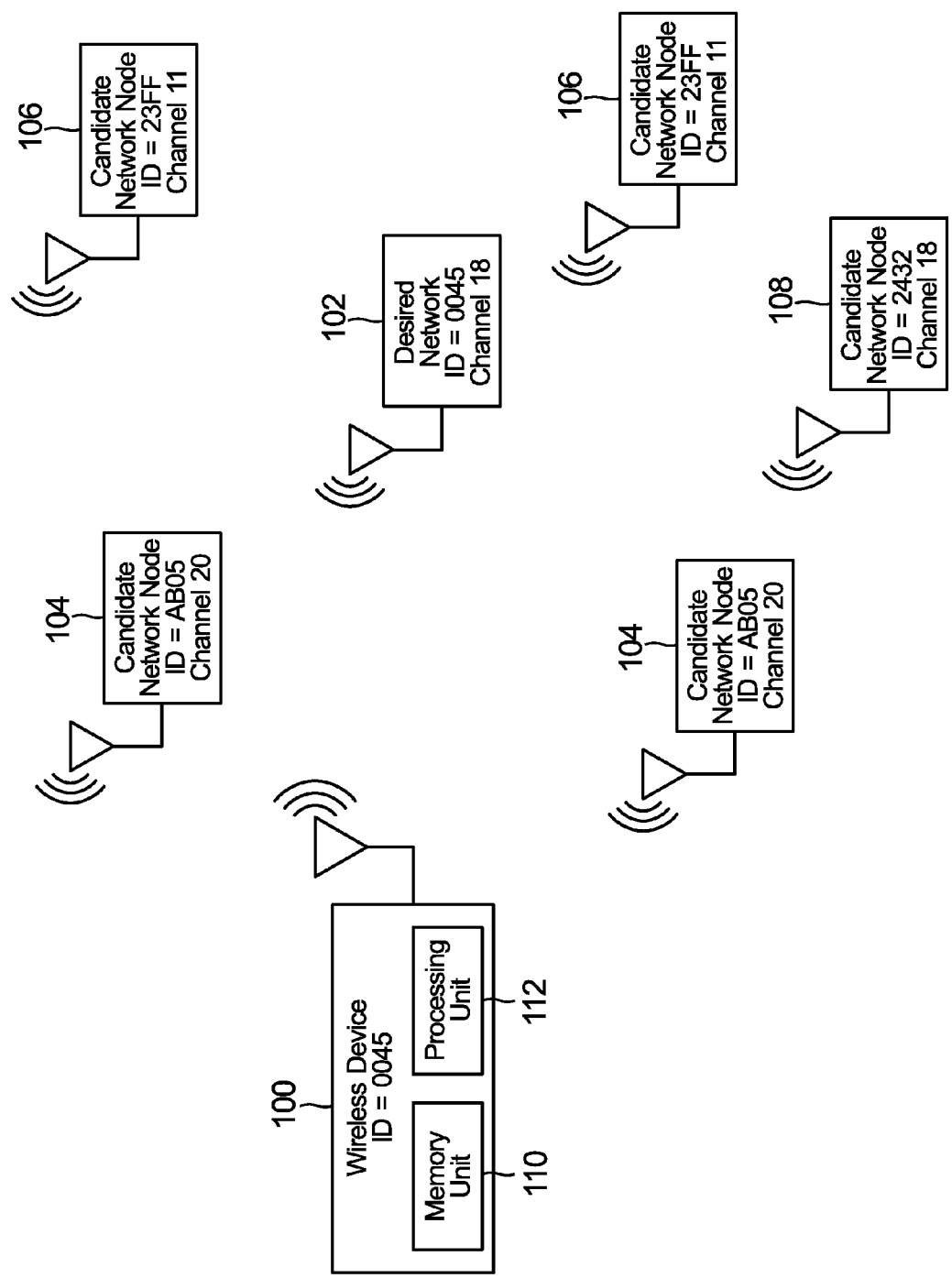
FIG. 1 is a block diagram of a wireless device within a network environment in one embodiment described in the present disclosure.

FIG. 1 is a block diagram of a wireless device 100 attempting to connect to a desired network in an environment where there are multiple candidate networks to which the wireless device may connect. In at least one embodiment, the wireless device 100 is a wireless device that communicates wirelessly according to the ZigBee specification. Alternatively, the wireless device 100 may communicate according to other communication specifications such as Bluetooth, Infrared Data Association, Wi-Fi, a body area network, or the like. The wireless network to which the wireless device 100 connects may be a mesh network, a multipoint network, a ZigBee network, or other possible network that uses a particular topology or combination of topologies.

In at least one embodiment, the wireless device 100 includes a memory unit 110 and a processing unit 112. The processing unit 112, as described herein, includes or functions with software programs, firmware or other computer readable instructions for carrying out various methods, process tasks, calculations, and control functions, used in controlling the operation of the wireless device 100. The computer readable instructions are typically stored on any appropriate computer readable medium used for storage of computer readable instructions or data structures. The computer readable medium can be implemented as any available media that can be accessed by the processing unit 112, where the processing unit 112 may be a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. In some embodiments, the instructions can be stored in the memory unit 110 or other memory.

In certain implementations, when initially configured or when connecting to a network for the first time, the wireless device 100 may attempt to identify and associate with a particular desired network 102. However, in many networking environments, identifying a particular network can be challenging. For example, in certain environments, there may be multiple candidate networks such that, depending on the method used to identify the potential candidate networks, the other networks affect whether or not the desired network 102 is discovered. As discussed above, using methods such as first responder and best responder may lead to situations where the desired network 102 is not identified or the identification of the desired network 102 takes an extended period of time. As disclosed herein, embodiments are described herein that facilitate the discovery and association of the desired network 102 by the wireless device 100.

In certain implementations, the possible candidate networks to which a wireless device 100 may connect are identified by a particular channel and identifier. As used herein, a channel refers to a portion of the radio frequency spectrum within a frequency band. For example, the wireless devices may communicate in the 2.4 GHz band, which may be divided into multiple channels. Nodes in a network communicate over a particular channel and the member nodes of a particular network may identify themselves by network identifiers. For example, the member nodes may be part of a personal area network and may identify themselves by PAN IDs. In some implementations, networks that communicate on different channels may use the same identifier. However, in other implementations, different networks have different network identifiers regardless of the channel that is used for communication by the network.

In determining which network to join, the wireless device 100 transmits a network device request. In an environment, where there are multiple channels through which the wireless device 100 may communicate, the wireless device 100 transmits a network device request on a particular channel. In response to the network device request, the wireless device 100 may receive a number of network device responses, where the network device responses include the different network identifiers for the different candidate network. When the communications are performed according to the ZigBee specification, the wireless device may transmit beacon requests and receive beacon responses. As used herein, the terms "beacon requests" and "beacon responses" are respectively interchangeable with the terms "network device requests" and "network device responses". For example, a network device request may broadly refer to any data transmitted from the wireless device asking for a response from other network devices in the environment of the wireless device. The other network devices in the environment then may provide a network device response in reply to the network device request. In at least one implementation, the wireless device 100 searches for a network having a particular network identifier. As described herein, to perform the search for the desired network 102, the wireless device 100 conducts a short list search, an exhaustive search, or a combined short list and exhaustive search.

In certain embodiments, when the wireless device 100 performs a short list search when searching for the desired network 102, the wireless device 100 attempts to fill a short list with identifiers of unique networks by progressively stepping through the possible channel and transmit power level combinations for network device requests. When the short list is filled or all the transmit power level and channel transmission combinations have been tried, the wireless device 100 then steps through the unique networks identified in the short list until either the desired network 102 is identified or all the elements in the short list have been tried. When the desired network 102 is identified, the wireless device 100 associates with that network.

In an example of a the wireless device 100 performing a short list search, memory unit 110 on wireless device 100 stores a short list having space for 3 network candidates.

While the short list in this embodiments has space for 3 network candidates, one having skill in the art would recognize that the short list may include space for a finite number of candidates that is limited by the space available to store the short list within the memory unit. The wireless device 100 first attempts to discover networks that respond to a network device request that is transmitted at a low power level. Accordingly, the wireless device 100 steps through the possible channel combinations at the lowest transmit power. Frequently, the candidate network nodes that are closest to the wireless device 100 provide network device responses when the network device request is transmitted at the lowest power level. As such, in one exemplary implementation, the wireless device 100 receives a network device response from a candidate network 104 where candidate network 104 is identified by the network identifier AB05 and is transmitting on channel 20. After transmitting a network device request at every channel at the lowest transmit power, the wireless device 100 increases the transmit power and progressively broadcasts a network device request at the different channels. For example, at the next highest transmit power, the wireless device 100 receives a network device response from candidate network 106 on channel 11, which is identified by network identifier 23FF. The wireless device 100 also receives a network device response from desired network 102 on channel 18, where the desired network 102 is identified by network identifier 0045. As the wireless device 100 has received network device responses from three different and unique networks, the short list on the memory unit 110 is full. When the short list is full, the wireless device 100 stops transmitting network device requests.

In certain embodiments, when the short list is full, the wireless device 100 begins to step through the short list until the wireless device 100 has attempted associating with all the networks identified in the short list. For example, as the desired network 102 is stored in the short list, the wireless device 100 steps through the short list until the wireless device 100 reaches the desired network 102. When the wireless device 100 reaches the desired network, the wireless device 100 attempts to associate with the desired network 102. In certain implementations, the wireless device 100 identifies the desired network 102 based on the network identifier of the desired network 102.

In alternate implementations, the wireless device 100 performs an exhaustive search. In the exhaustive search, the wireless device steps through the different channels and broadcasts a network device request. Then for each channel, the wireless device 100 identifies the joinable network device responses and arranges the networks identified by the joinable network device responses based on network identifiers. The wireless device 100 then attempts to associate with the different identified networks, incrementing through the possible networks and stepping through the different channels until the desired network is identified.

As shown in FIG. 1, when wireless device 100 performs an exhaustive search, the wireless device 100 begins at channel 11. At this channel, wireless device 100 broadcasts a network device request. In response to the network device request, nodes in candidate network 106 transmit a network device response. In certain implementations, the wireless device 100 may determine that the network associated with the network device response is not joinable. When it is not joinable, the wireless device 100 will not attempt to associate with the network. However, when the network device response is joinable, the wireless device attempts to join with the network. As network 106, is not the desired network 102, the wireless device 100 is unsuccessful at joining with the network 106. As the wireless device 100 was unsuccessful at joining with the network, the wireless device 100 alternatingly increases the channel and checks for other joinable networks.

In the particular example illustrated in FIG. 1, the wireless device 100 increases the channel until the wireless device 100 broadcasts a network device response on channel 18. On channel 18, the wireless device 100 receives two different network device responses. One of the network device responses is associated with the desired network 102, which has a network identifier of 0045, and the other network device response is associated with the candidate network 108, which has a network identifier of 2432. To determine the order in which the wireless device 100 will attempt to associate with the two different networks, the wireless device 100 sorts the network device responses according to the network identifiers. In one implementation, the wireless device 100 sorts the network identifiers in ascending order. In an alternative implementation, the wireless device 100 sorts the network identifiers in descending order. The networks are sorted such that the wireless device 100 can step through the different networks without missing one of the networks or repeating attempts at associating with a particular network. Accordingly, on channel 18, the wireless device 100 sorts the received network device responses such that the wireless device 100 attempts to associate with the desired network 102 before the candidate network 108. The desired network 102 is tried first because the network identifier for the desired network 102 is less than the network identifier for the candidate network 108. When the wireless device 100 attempts to associate with candidate network 108, the wireless device 100 is able to successfully associate with the desired network 102. As the wireless device 100 has successfully associated with the desired network 102, the wireless device 100 ends the exhaustive search.

As described above, the wireless device 100 is able to perform a short list search or an exhaustive search when attempting to find the desired network 102. As the short list search has the potential to more quickly identify the desired network, in certain implementations, the wireless device 100 attempts to perform a short list search before attempting to perform an exhaustive search. For example, if the wireless device 100 is unable to associate with the desired network 102 during the performance of the short list search, then the wireless device 100 then proceeds to perform an exhaustive search. In performing the above described searches, the wireless device 100 is able to more effectively discover the desired network 102.

Figure 2:
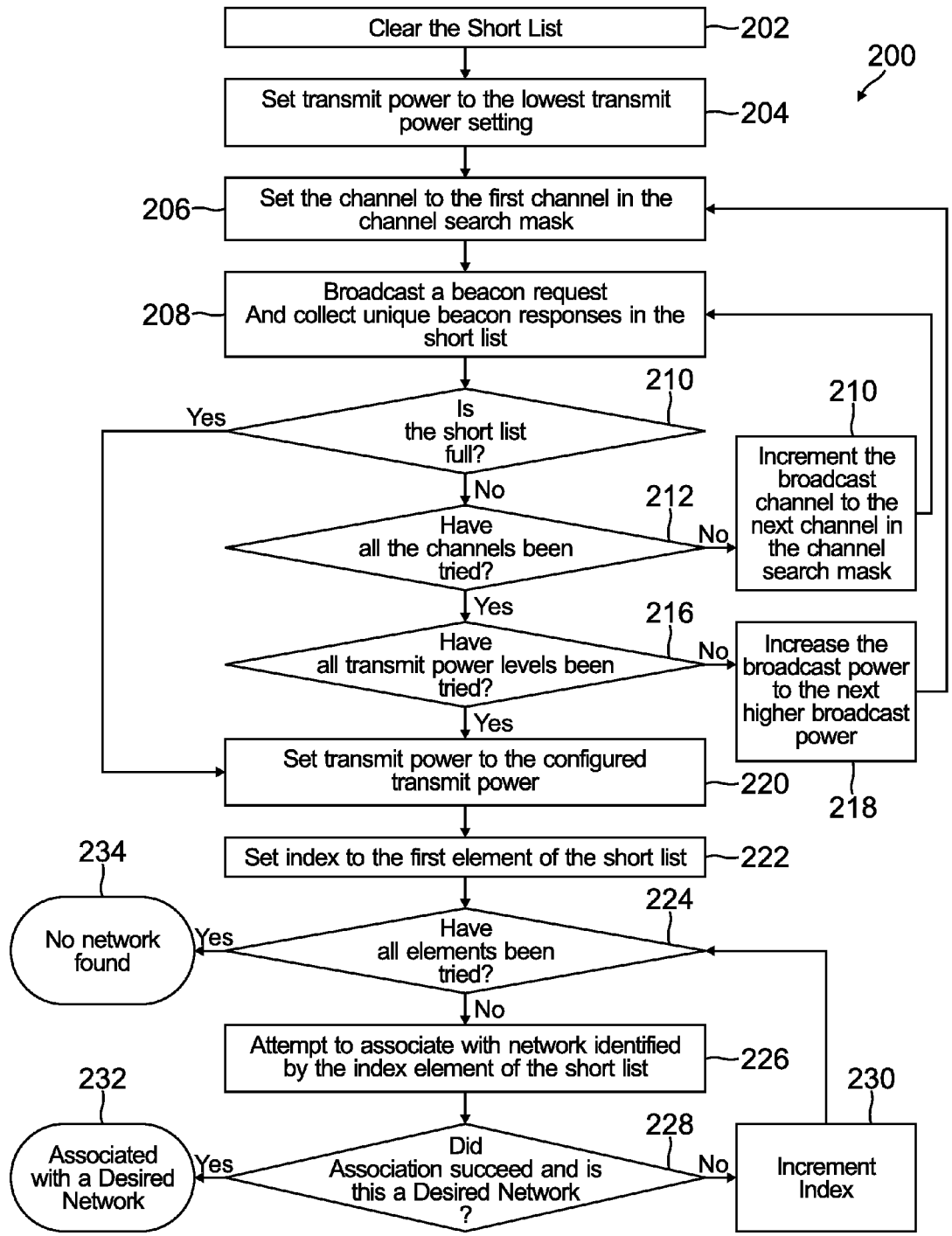
FIG. 2 is a flow diagram of a process for conducting a short list search in one embodiment described in the present disclosure.

FIG. 2 is a flow diagram illustrating an exemplary method 200 of a short list search performed by a wireless device, when the wireless device is attempting to associate with a network in an environment containing multiple networks. For example, the method 200 proceeds at 202 where a short list is cleared. For example, the short list 202 stores a list of network identifiers that are associated with identified networks in the environment of the wireless device. In certain implementations, the wireless device that performs the method 200 functions similarly to the wireless device described above in relation to FIG. 1. As the wireless device may have data stored in the short list from a previously conducted short list search, the wireless device initializes the short list by clearing the short list of any previously stored network identifiers or other possible information.

When the short list is cleared, the method 200 proceeds to 204, where the transmit power is set to the lowest transmit power setting. In certain implementations, the wireless device sets the transmit power to the lowest setting to discover networks that are physically closest to the wireless device. In certain environments, the desired network is more likely to be near the wireless device. When the transmit power has been set to the lowest power setting, the method 200 proceeds to 206, where the channel is set to the first channel in the channel search mask. For example, instructions direct a processing unit on the wireless device to set the channel to a first channel in a channel search mask. In one particular example, if the channels in a particular frequency band are number 1-26, the first channel for the wireless device is set to channel 1.

In at least one embodiment, when the transmit power has been set to the lowest setting and the channel has been set to the first channel in a channel search mask, the method 200 proceeds to 208, where a network device request is broadcast and unique network device responses are collected in the short list. For example, when the wireless device transmits a network device request into an environment, candidate network nodes that receive the network device request will transmit a network device response back to the wireless device. When the wireless device receives a unique network device response or a network device response conveying a network identifier that has not yet been received, the wireless device 100 will add the network identifier to a short list stored on a memory unit on the wireless device.

In at least one implementation, when all the unique network device responses that were received on a particular channel and transmit power have been added to the short list, the method 200 proceeds to 210 to determine if the short list is full. The short list, a dedicated list for the storage of unique network device responses, is full when there is no more memory associated with the short list left to store unique network device responses. When the short list still has memory left to store unique network device responses, the method 200 proceeds to 212, where the wireless device determines if all the channels have been tried. If there are channels that have not been tried, the method 200 proceeds to 214 where the channel is incremented to the next channel in the channel search mask. When the channel is incremented, the method 200 returns to 208 to broadcast a network device request to gather further unique network device requests at the newer search channel. Returning to 212, if all the channels have been tried, the method 200 proceeds to 216 to check if all the transmit power levels have been tried. If there are more transmit power levels, the method 200 proceeds to 218, where the broadcast power is increased to the next higher broadcast power. When the broadcast power has been increased, the method 200 returns to 206, where the method sets the channel to the first channel in the channel search mask. The wireless device then will continue to progressively increment the channel, transmit network device requests, and add unique network device responses to the short list until either the wireless device has either broadcast network device requests using the possible different channel and transmit power combinations or the short list is full.

In certain embodiments, when either network device requests on the possible combination of channel and transmit power have been transmitted or the short list is full, the method 200 proceeds to 220, where the transmit power is set to the configured transmit power of the wireless device. For example, the configured transmit power is the transmit power at which the wireless device communicates during normal operation. When the wireless device has been set to transmit power at the configured transmit power, the method 200 proceeds to 222, where an index is set to the first element of the short list. For example, the wireless device, having built the short list, proceeds to progressively associate with the different networks identified in the short list.

In at least one exemplary implementation, the method 200 proceeds to 224, to determine if the wireless device has attempted to associate with all the elements in the short list. If association with all the elements in the short list has been attempted, the method 200 proceeds to 234 as no network was found. However if there are still elements in the short list that identify networks that the wireless device has yet attempted association, the method 200 proceeds to 226, where association with the network identified by the index element of the short list is attempted. When association is attempted, the method 200 proceeds to 228, to determine whether the association succeeded and whether the association was with a desired network. For example, in certain implementations, the wireless device stores a network identifier that matches the network identifier of the desired network. If the associated network has the same network identifier, then the wireless device determines that the association was successfully accomplished with the desired network. In at least one alternative implementation, upon reception of a network device response, the wireless device pre-filters received network responses based on the network identifier. For instance, the wireless device may validate the network identifier before adding the network identifier to the short list. Then to successfully associate with one of the networks, the wireless device may attempt to discover if the network coordinator is reachable. If the network coordinator is reachable, the wireless device may associate with the identified network. When the association is successfully accomplished with the desired network, the method 200 proceeds to 232, where the wireless device associates with the desired network. However, if the associated network has a different network identifier or the association was unsuccessful for another reason, the method 200 proceeds to 230 and increments the index such that it points to the next element in the short list. When the index has been incremented, the method returns to 224 where the method attempts to associate with another network in the short list or determines that all elements in the short list have been tried. By performing method 200, the wireless device may identify the desired network in a quick manner. However, as the search is limited by how many different networks can be identified within the shortlist, the short list search exemplified by method 200 may be unsuccessful if the desired network is not identified within the short list.

Figure 3:
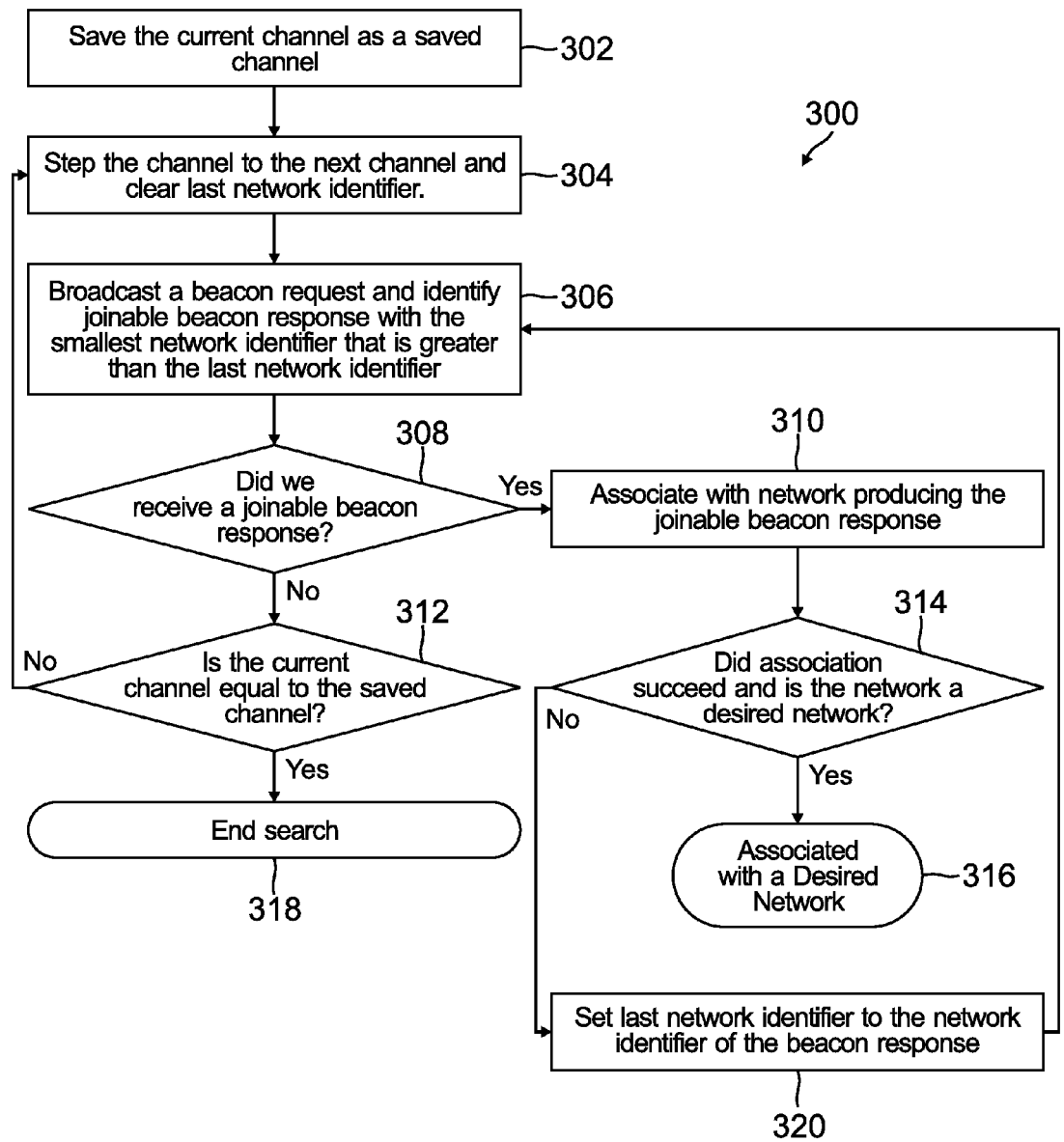
FIG. 3 is a flow diagram of a process for conducting an exhaustive search in one embodiment described in the present disclosure.

In certain implementations, an exhaustive search may be performed that identifies the different possible networks. FIG. 3 provides a flow diagram illustrating a method 300 for performing an exhaustive search for the desired network within an environment. Method 300 proceeds at 302, where the current channel is saved as a saved channel. The current channel is saved as the saved channel because the method 300 cycles through the different broadcast channels. When the channel returns to the saved channel, the method 300 has tried the different possible channels and determines that the desired network was not found in the environment.

In a further embodiment, after saving the current channel, the method 300 proceeds to 304 where the channel is stepped to the next channel and a last network identifier is cleared. For example, the "last network identifier" refers to an identifier that identifies a particular network, a network device response, or other device in the environment of the wireless device. In certain implementations, the last network identifier identifies separate personal area networks (PANs), when the last network identifier identifies a PAN identifier, to clear the last network identifier, the wireless device may zero the last network identifier. In other implementations, the network identifiers that are assigned to the last network identifier of devices that provided a network device response. Further, when the network identifier identifies devices that provided a network device response, the last network identifier may be applied to the network device responses that were filtered based on the network identifiers included in the network device responses. When the last network identifier is cleared, method 300 proceeds at 306, where a network device request is broadcast and a joinable network device response with the smallest network identifier that is greater than the last network identifier is identified. For example, the wireless device broadcasts a network device request on the previously set channel. When the wireless device receives network device responses in response to the network device request, the wireless device identifies the network device response that has the smallest network identifier that is greater than the set last network identifier.

In certain implementations, the method 300 proceeds at 308 where the wireless device determines if a joinable network device response was received. In certain implementations, a joinable network device response corresponds to information about the network device response or information contained in the network device response that satisfies a set of predetermined criteria. For example, in certain device, a joinable network device response may include information having a permit join flag enabled, a network identifier, end device capacity, or other possible network characteristic that may be used in creating a join criterion. If there was no network device response received in reply to the network device request or the network identifiers for the received network device response are all less than or equal to the last network identifier, then the method 300 proceeds to 312, where the wireless device determines if the current channel is equal to the saved channel. If the current channel is equal to the saved channel, then the wireless device has searched through the available channels without finding a desired network and the method 300 proceeds to 318 where the exhaustive search ends. In contrast, if the current channel is not equal to the saved channel, the method 300 returns to 304 where the channel is incremented to the next channel. When the channel is incremented to the next channel, the wireless device will then attempt to find a desired network on the new channel.

In a further embodiment, returning to 308, when the wireless receives a joinable network device response, the method 300 proceeds at 310 where the wireless device associates with the network producing the joinable network device response. Further, the method 300 proceeds at 314, where the wireless device determines if the association succeeded and whether the network is a desired network. The wireless device determines whether the network is a desired network in a similar manner as described above in relation to block 228 in FIG. 2. Accordingly, if the association succeeds and the network is a desired network, the method 300 proceeds at 316 where the wireless device associates with the desired network. However, if the association fails or the network is not a desired network, the method 300 proceeds at 320 where the last network identifier is set to the network identifier of the joinable network device response. When the last network identifier is set to the network identifier of the joinable network device response, the method 300 returns to 306 to check if there any other joinable network device responses on the channel where the newly set last network identifier is used to identify the next joinable network as described above in relation to 306. As shown above in relation to FIG. 3, the wireless device performs an exhaustive search.

Figure 4A:
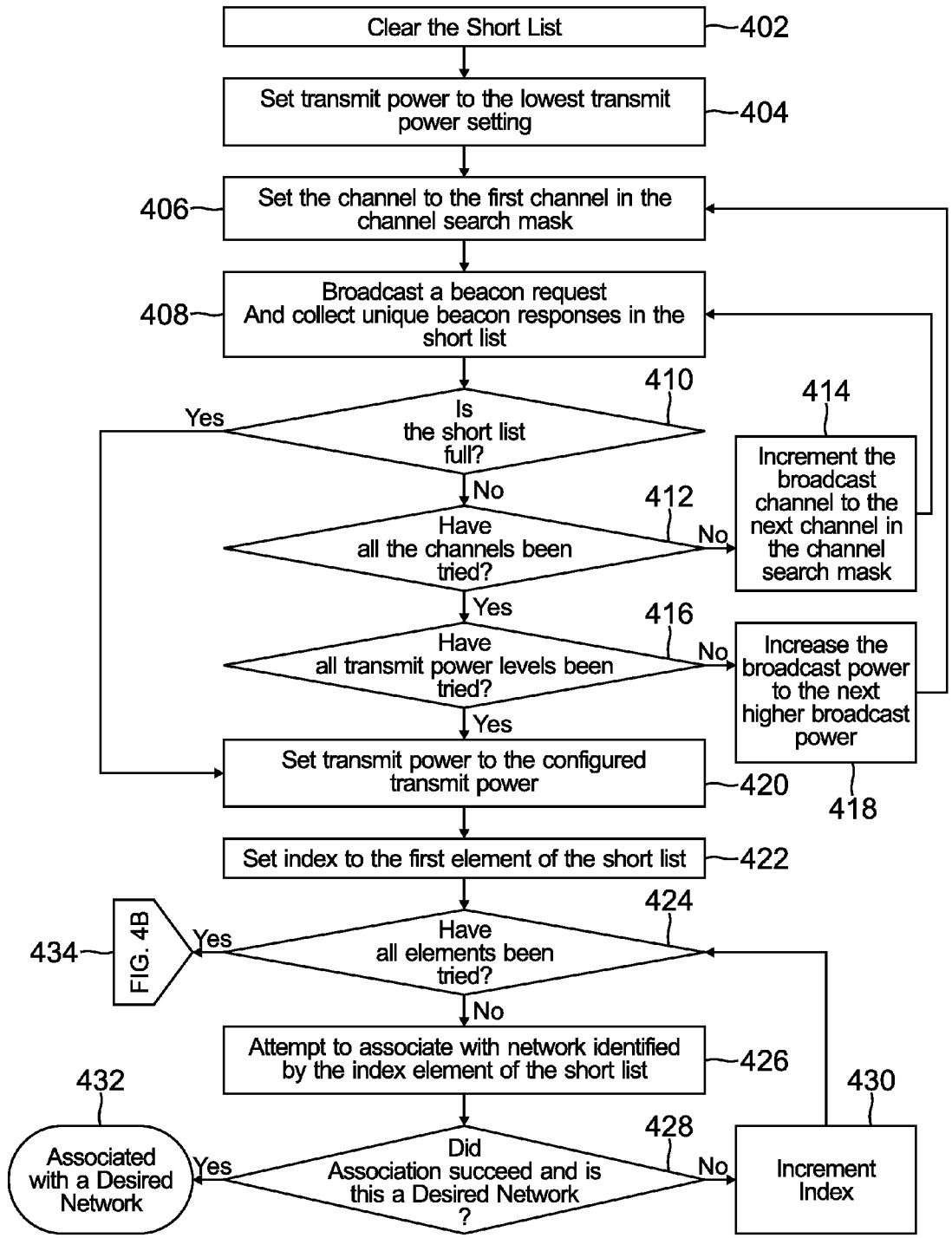
FIGS. 4A and 4B are flow diagrams of a process for conducting a combined exhaustive search and short list search in one embodiment described in the present disclosure.
Figure 4B:
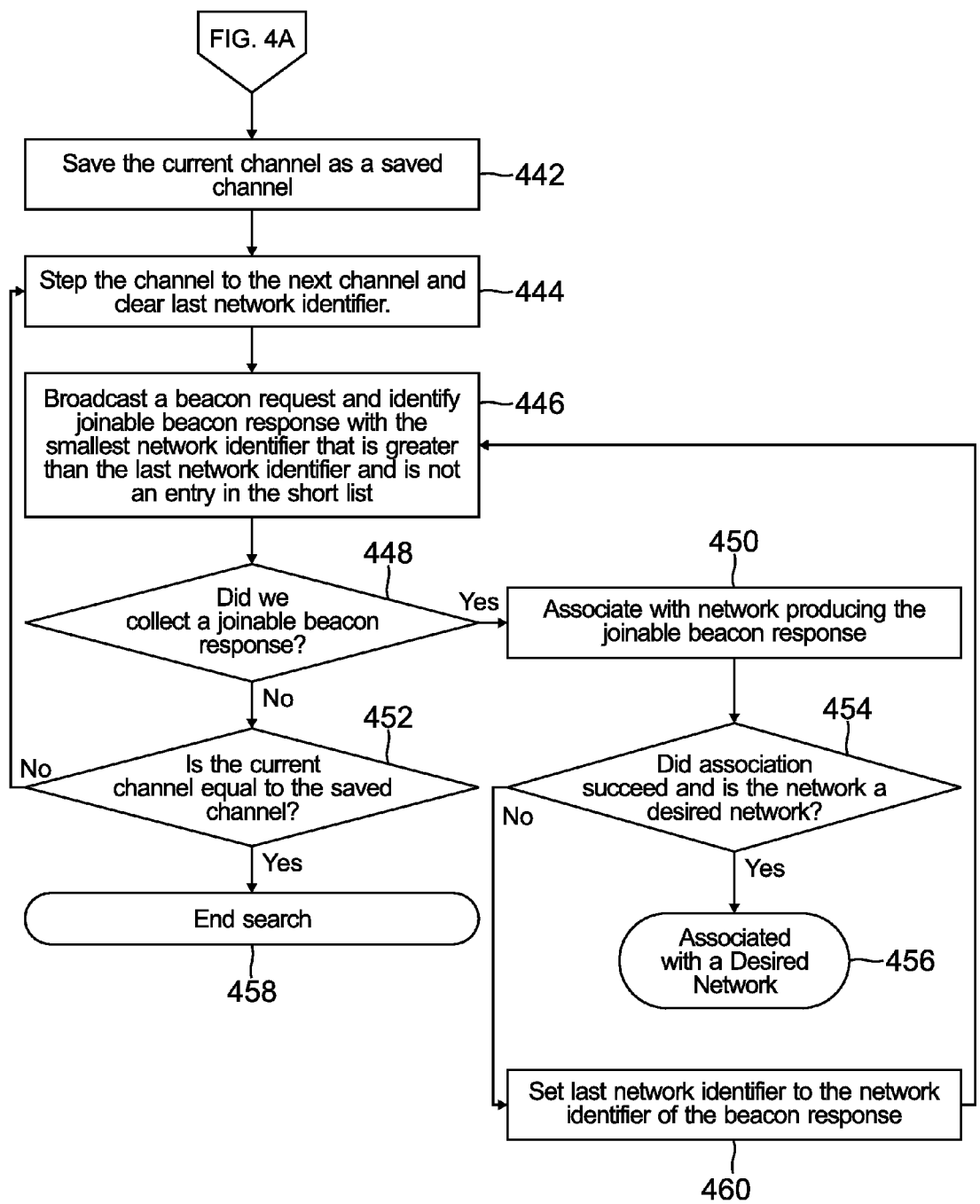

In certain implementations, a wireless device may perform a combined short list search and exhaustive search. For example, FIGS. 4A and 4B illustrate a flow diagram of a method 400 for performing a combined search, where the combined search includes both a short list search and an exhaustive search. As illustrated, method 400 includes descriptive blocks 402-432. In certain implementations, descriptive blocks 402-432 in FIG. 4A are respectively similar to blocks 202-232 in FIG. 2. Likewise, descriptive blocks 442-460 are respectively similar to blocks 302-320 in FIG. 3. Accordingly, the above descriptions of the short list search and the exhaustive search apply to the corresponding elements in FIGS. 4A and 4B. Further, as illustrated in FIGS. 4A and 4B, the short list is performed before the exhaustive search because in certain implementations, the short list search may find the desired network faster than the exhaustive search. However, there is a higher probability that the short list search will be unsuccessful at finding the desired network. Due to the possibility of an unsuccessful search, at 424 method 400 determines if all the elements on the short list have been tried. If all of the elements have been tried, method 400 proceeds to 434 which corresponds with the exhaustive search. In respect to the exhaustive search, the exhaustive search proceeds as described above with the exception represented at 446 in method 400. As the wireless device has already attempted associating with the networks identified in the short list. When the wireless device performs the exhaustive search, the method 400 will only attempt to associate with networks that were not previously identified on the short list. If, at the end of the exhaustive search, the desired network has not been identified, the wireless device may stop searching for the desired network. Alternatively, the wireless device may attempt a different search method, provide a notification of search failure, or the like.

As described above, multiple methods and embodiments have been described that are performed by a wireless device when searching for a desired network. By using either the short list search, the exhaustive search, or the combination of the short list search and the exhaustive search, a wireless device can associate with the desired network with an increased likelihood of success while saving time and energy in the performance of the search.

Figure 5:
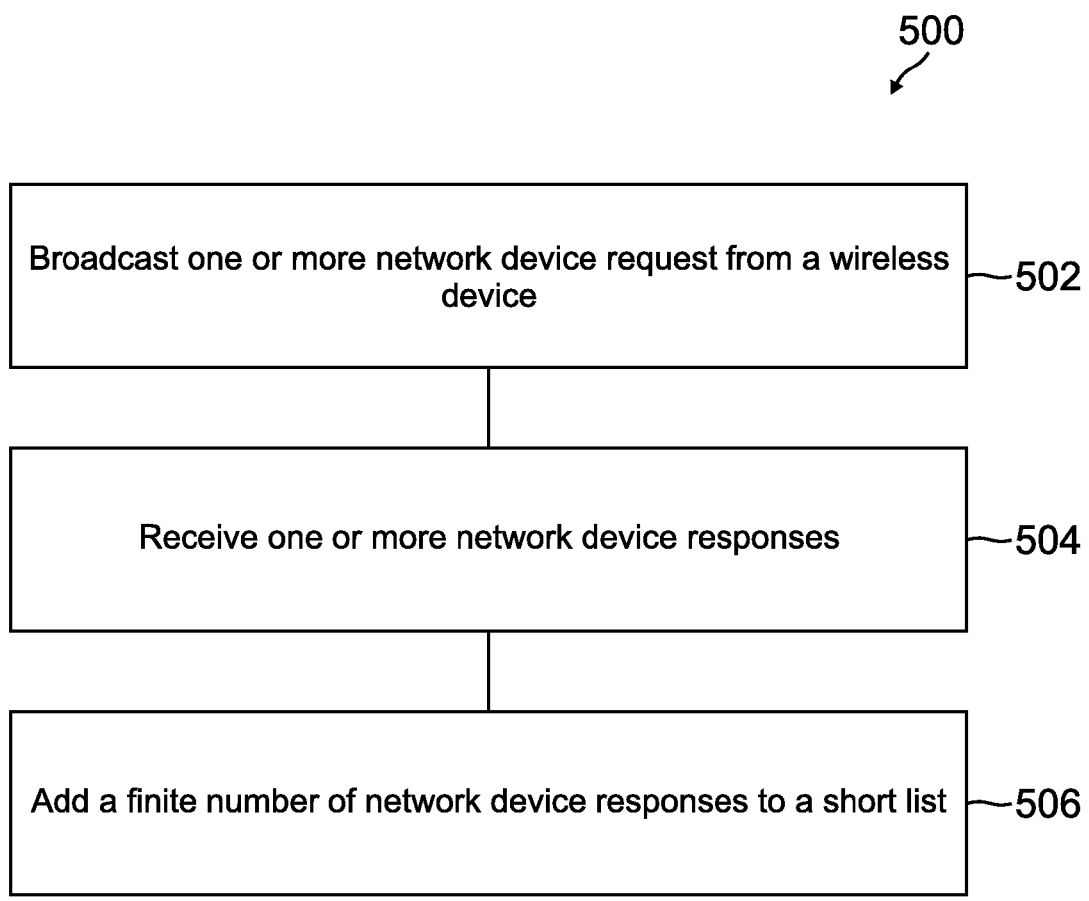
FIG. 5 is a flow diagram of a method for conducting a short list search in an additional embodiment described in the present disclosure.

FIG. 5 is a flow diagram illustrating a method 500 for performing a short list search according to at least one embodiment. In at least one exemplary implementation, method 500 proceeds at 502, where at least one network device request is broadcast from a wireless device. As described above, a wireless device is attempting to discover and connect to a network. To discover networks in the local environment of the wireless device, the wireless device transmits a network device request. In certain implementations, the wireless device transmits the network device request at a particular transmission power and on a particular channel. Further, method 500 proceeds at 504, where at least one network device response is received. For example, when network nodes in the environment of the wireless device receive the broadcast network device request, the nodes may respond with a network device response.

In certain embodiments, method 500 proceeds at 506, where a finite number of unique network device response are added to a short list. For instance, the wireless device stores the received unique network device responses in a short list in memory. The short list is a list that stores a limited number of different network device responses. In one implementation, the wireless device adds unique network device responses to the short list until the short list is either full or there are no more unique network device responses to add to the short list. In a further implementation, the wireless device steps through the different networks stored on the short list until either the wireless device is associated with the desired network, or the wireless device has attempted failed associations with each network identified in the short list. In certain implementations, as described above, when the wireless device fails to associate with the desired network when performing the short list search, the wireless device may proceed by performing an exhaustive search.

Figure 6:
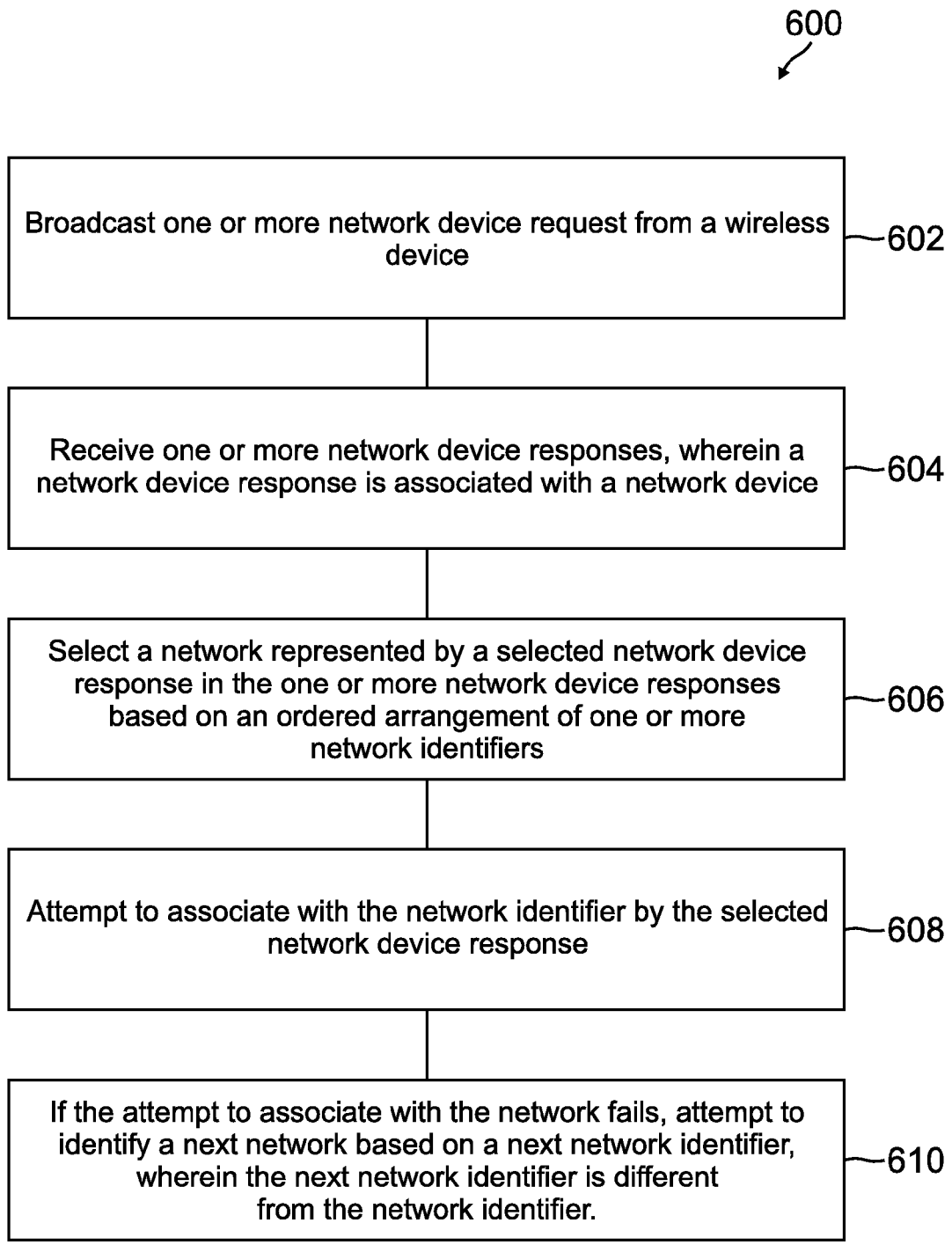
FIG. 6 is a flow diagram of a method for conducting an exhaustive search in an additional embodiment described in the present disclosure.

FIG. 6 is a flow diagram illustrating a method 600 for performing an exhaustive search according to at least one embodiment. In at least one exemplary implementation, method 600 proceeds at 602, where at least one network device request is broadcast from a wireless device. For example, the wireless device broadcasts a network device request on a particular channel. In at least one implementation, the wireless device saves the initial channel and then progressively steps through the different channels until the wireless device either associates with the desired networks or broadcasts a network device request on the different channels and failed to associate with the networks represented by the joinable network device responses that were received in reply to the network device requests. Further, method 600 proceeds at 604, where at least one network device response is received, wherein a network device response is associated with a network device. Also, method 600 proceeds at 606, where a network represented by a selected network device response in the at least one network device response is selected based on an ordered arrangement of one or more network identifiers. For example, in response to a network device request, the wireless device may receive more than one network device response. When receiving more than one network device response, the wireless device selects the network device response containing the smallest network identifier.

In certain embodiments, method 600 proceeds at 608, where association with the network identified by the selected network device response is attempted. For example, the wireless device then attempts associating with the network represented by the network device response having the smallest network identifier. If the attempt to associate with the network fails, method 600 proceeds at 610, where the identification of a next network based on a next network identifier is attempted, where the next network identifier is different from the network identifier. For example, if the association fails, the wireless device attempts association with the other networks in order of ascending network identifiers received from a further network device request.

Example Embodiments

Example 1 includes a method for finding a desired network, the method comprising: broadcasting one or more network device requests from a wireless device, wherein a network device request in the one or more network device requests solicits information from one or more network devices in an environment of the wireless device; receiving one or more network device responses, wherein a network device response in the one or more network device responses is associated with a network device in the one or more network devices; adding a finite number of network device responses to a short list in memory.

Example 2 includes the method of Example 1, wherein the wireless device communicates according to a ZigBee specification.

Example 3 includes the method of any of Examples 1-2, wherein the one or more network device requests comprise a plurality of network device requests, wherein each network device request in the plurality of network device requests is transmitted at a different transmit power, and the wireless device incrementally steps through transmission of the plurality of network device requests at different power levels.

Example 4 includes the method of any of Examples 1-3, wherein the one or more network device requests comprise a plurality of network device requests, wherein each network device request in the plurality of network device requests is transmitted on a different channel, and the wireless device incrementally steps through transmission of the plurality of network device requests on different channels.

Example 5 includes the method of any of Examples 1-4, wherein the one or more network device requests comprise a plurality of network device requests, wherein each network device request in the plurality of network device requests is transmitted on a different combination of transmit power and channel, and the wireless device incrementally steps through transmission of the plurality of network device requests at different combinations of transmit power and channel.

Example 6 includes the method of any of Examples 1-5, further comprising attempting to associate with networks associated with elements in the short list until the wireless device is associated with the desired network or the wireless device has attempted a failed association with the networks associated with the elements in the short list.

Example 7 includes the method of Example 6, further comprising performing an exhaustive search when the wireless device has failed to associate with the networks associated with the elements in the short list.

Example 8 includes the method of Example 7, wherein the exhaustive search comprises: broadcasting one or more additional network device requests from the wireless device; receiving one or more additional network device responses, wherein each additional network device response in the one or more additional network device responses is associated with an additional network device in the environment of the wireless device; selecting an additional network represented by a selected additional network device response in the one or more additional network device responses, wherein the additional network is selected based on an ordered arrangement of one or more network identifiers associated with the one or more additional network device responses, wherein a network identifier in the one or more network identifiers is not derived from the finite number of network device responses identified in the short list; and attempting to associate with the additional network identified by the selected additional network device response.

Example 9 includes the method of Example 8, further comprising: broadcasting a further network device request, when the attempt to associate with the additional network fails; attempting to identify a next additional network based on a next network identifier received in response to the further network device request, wherein the next network identifier is proximate to the network identifier in the ordered arrangement of the one or more network identifiers.

Example 10 includes the method of any of Examples 8-9, wherein the one or more additional network device requests are transmitted on different channels, and the wireless device incrementally steps through transmission of the one or more additional network device requests on the different channels.

Example 11 includes the method of any of Examples 8-10, further comprising: saving an initial channel in the different channels; and determining that the one or more network device requests have been attempted on the different channels when the wireless device steps through the different channels and is configured to broadcast on the initial channel again.

Example 12 includes the method of any of Examples 1-11, wherein adding a finite number of network device responses to a short list in memory comprises determining whether to add the one or more network device responses to the short list based on network identifiers associated with the one or more network device responses.

Example 13 includes a method for finding a desired network, the method comprising: broadcasting one or more network device requests from a wireless device, the wireless device trying to discover the desired network, wherein a network device request in the one or more network device requests solicits information from one or more network devices in an environment of the wireless device; receiving one or more network responses, wherein a network device response in the one or more network responses is associated with a network device in the one or more network devices; selecting a network represented by a selected network device response in the one or more network device responses, wherein the network is selected based on an ordered arrangement of one or more network identifiers associated with the one or more network device responses; and attempting to associate with the network identified by the selected network device response if the attempt to associate with the network fails, attempt to identify a next network based on a next network identifier, wherein the next network identifier is different from the network identifier.

Example 14 includes the method of Example 13, further comprising: broadcasting a further network device request, when the attempt to associate with the network fails; attempting to identify a next network based on a next network identifier received in response to the further network device request, wherein the next network identifier is proximate to the network identifier in the ordered arrangement of the one or more network identifiers.

Example 15 includes the method of any of Examples 13-14, wherein the ordered arrangement of the one or more network identifiers is numeric.

Example 16 includes the method of any of Examples 13-15, wherein the one or more network device requests comprise a plurality of network device requests, wherein each network device request in the plurality of network device requests is transmitted on a different channels, and the wireless device incrementally steps through transmission of the plurality of network device requests on the different channels.

Example 17 includes the method of Example 16, further comprising: saving an initial channel in the different channels; and determining that the one or more network device requests have been attempted on the different channels when the wireless device steps through the different channels and is configured to broadcast on the initial channel again.

Example 18 includes a wireless device, the device comprising: a processor that controls data received and data to be transmitted by the wireless device; a memory, wherein the memory stores at least a short list and instructions, wherein the short list stores a finite number of network device responses, wherein a network device response is associated with a network device in an environment of the wireless device; wherein the instructions direct the processor to: perform a short list search, wherein the wireless device attempts to connect to networks associated with the network devices identified by the finite number of network device responses stored in the short list; and when the wireless device fails to connect with the networks associated with the network devices identified by the network device responses stored in the short list, perform an exhaustive search, wherein the wireless device attempts to connect to additional networks associated with additional network devices based on an ordered arrangement of network identifiers in a plurality of network device responses, wherein the plurality of network device responses were received in response to a plurality of network device requests.

Example 19 includes the method of any of Examples 8-18, wherein the finite number of network device responses are added to the short list based on network identifiers associated with the one or more network device responses.

Example 20 includes the system of any of Examples 18-19, wherein each network device request in the plurality of network device requests is transmitted on a different combination of transmit power and channel, and the wireless device incrementally steps through transmission of the plurality of network device requests at the different combinations of transmit power and channel.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for finding a desired network, the method comprising:
    broadcasting one or more network-device requests from a wireless device, wherein a network-device request in the one or more network-device requests solicits information from one or more network devices in an environment of the wireless device;
    receiving one or more network-device responses, wherein each network device response in the one or more network-device responses is associated with a network device in the one or more network devices;
    selecting a network represented by a selected network-device response in the one or more additional network-device responses, wherein the network is selected based on an ordered arrangement of one or more network identifiers associated with the one or more network-device responses;
    attempting to associate with the network identified by the selected network-device response;
    attempting to identify a next additional network based on a next network identifier received in response to the further network-device request, wherein the next network identifier is proximate to the network identifier in the ordered arrangement of the one or more network identifiers;
    attempting to associate with the next additional network; and
    broadcasting a further network-device request, when the attempt to associate with the network fails.

2. The method of claim 1, wherein the wireless device communicates according to a ZigBee specification.

3. The method of claim 1, wherein the one or more network-device requests are transmitted on different channels, and the wireless device incrementally steps through transmission of the one or more additional network-device requests on the different channels.

4. The method of claim 3, further comprising performing a search after the wireless device has failed to associate with the networks associated with the channels from a finite predetermined order of selected channels.

5. The method of claim 3, further comprising:
saving an initial channel in the different channels; and
determining that the one or more network-device requests have been attempted on the different channels when the wireless device steps through the different channels and is configured to broadcast on the initial channel after attempting to broadcast on the other channels in the different channels.

6. The method of claim 1, further comprising:
saving the next network identifier as a saved network identifier, wherein the saved network identifier is iteratively changed through one or more network identifiers associated with the one or more network-device responses, until either the wireless device is associated with the desired network or the wireless device has failed in its attempt to associate with network identified by the one or more network identifiers.

7. A method for finding a desired network, the method comprising:
broadcasting one or more network-device requests from a wireless device, the wireless device trying to discover the desired network, wherein a network-device request in the one or more network-device requests solicits information from one or more network devices in an environment of the wireless device;
receiving one or more network-device responses, wherein a network-device response in the one or more network-device responses is associated with a network device in the one or more network devices;
selecting a network represented by a selected network-device response in the one or more network-device responses, wherein the network is selected based on an ordered arrangement of one or more network identifiers associated with the one or more network-device responses; and
attempting to associate with the network identified by the selected network-device response;
if the attempt to associate with the network fails, attempt to identify a next network based on a next network identifier, wherein the next network identifier is proximate to the network identifier in the ordered arrangement of the one or more network identifiers; and
broadcasting a further network-device request, when the attempt to associate with the network fails, wherein the next network is identified in response to the further network-device request.

8. The method of claim 7, wherein the ordered arrangement of the one or more network identifiers is numeric.

9. The method of claim 7, wherein the one or more network-device requests comprise a plurality of network-device requests, wherein each network-device request in the plurality of network-device requests is transmitted on a different channels, and the wireless device incrementally steps through transmission of the plurality of network-device requests on the different channels.

10. The method of claim 9, further comprising:
saving an initial channel in the different channels; and
determining that the one or more network-device requests have been attempted on the different channels when the wireless device steps through the different channels and is configured to broadcast on the initial channel again.

11. A wireless device, the device comprising:
a processor that controls data received and data to be transmitted by the wireless device;
a memory, wherein the memory stores a current channel, a last network identifier, a network identifier, and instructions, wherein the current channel is a channel being searched for a desired network, and wherein the last network identifier is associated with one of a last network association attempt or a last network with which the wireless device was associated, and wherein the network identifier is a next network with which the wireless device will attempt to associate;
wherein the instructions direct the processor to:
search a channel with network-device requests to solicit network device responses;
when the wireless device fails to connect with the networks associated with the network devices identified by the network-device responses, perform an exhaustive search of channels, wherein the wireless device attempts to connect to additional networks associated with additional network devices based on an ordered arrangement of possible network identifiers in a plurality of network-device responses, wherein the plurality of network-device responses were received in response to a plurality of network-device requests; and
broadcast a further network-device request.

12. The device of claim 11, wherein each network-device request in the plurality of network-device requests is transmitted on a different channel, and the wireless device incrementally steps through transmission of the plurality of network-device requests at the different channels.

* * * * *